(12) United States Patent
Creighton et al.

(10) Patent No.: US 8,999,413 B2
(45) Date of Patent: Apr. 7, 2015

(54) COATED DRIED FRUIT AND METHODS

(75) Inventors: Dean W. Creighton, Brooklyn Park, MN (US); Bryan Worwa, Elk River, MN (US)

(73) Assignee: General Mills, Inc., Minneapolis, MN (US)

( * ) Notice: Subject to any disclaimer, the term of this patent is extended or adjusted under 35 U.S.C. 154(b) by 978 days.

(21) Appl. No.: 12/604,509

(22) Filed: Oct. 23, 2009

(65) Prior Publication Data

US 2010/0104699 A1    Apr. 29, 2010

Related U.S. Application Data

(60) Provisional application No. 61/109,330, filed on Oct. 29, 2008.

(51) Int. Cl.
| A23B 7/16 | (2006.01) |
| A23K 1/18 | (2006.01) |
| A23L 1/00 | (2006.01) |
| A23L 1/212 | (2006.01) |
| A23B 7/02 | (2006.01) |

(52) U.S. Cl.
CPC ............... A23L 1/2125 (2013.01); A23B 7/02 (2013.01); A23B 7/16 (2013.01); A23L 1/0052 (2013.01)

(58) Field of Classification Search
USPC .................................. 426/102, 302
See application file for complete search history.

(56) References Cited

U.S. PATENT DOCUMENTS

| 1,853,151 | A | 4/1932 | Segur et al. |
| 2,611,708 | A | 9/1952 | Owens et al. |
| 2,909,435 | A | 10/1959 | Watters et al. |
| 3,933,086 | A | 1/1976 | Standing |
| 4,356,197 | A | 10/1982 | Devitt et al. |
| 4,542,033 | A | 9/1985 | Agarwala |
| 4,696,824 | A | 9/1987 | Meczkowski et al. |
| 4,961,943 | A | 10/1990 | Blanthorn et al. |
| 5,223,287 | A | 6/1993 | Kearns et al. |
| 5,364,643 | A | 11/1994 | Morimoto et al. |
| 5,376,391 | A | 12/1994 | Nisperos-Carriedo et al. |
| 5,665,414 | A * | 9/1997 | Sherwood et al. ............ 426/582 |
| 5,697,704 | A | 12/1997 | Coyle |
| 7,118,772 | B2 | 10/2006 | Froseth et al. |
| 2005/0053640 | A1 | 3/2005 | Hettiarachchy et al. |
| 2005/0196445 | A1 | 9/2005 | Augello |
| 2005/0214414 | A1 | 9/2005 | Miranda et al. |

FOREIGN PATENT DOCUMENTS

| EP | 1550378 A1 | 7/2005 |
| EP | 1654933 A1 | 5/2006 |
| GB | 2016042 A | 9/1979 |
| GB | 2257891 A | 1/1993 |
| JP | 4190757 A | 7/1992 |
| JP | 6153783 A | 6/1994 |
| WO | WO 2004/032654 A1 | 4/2004 |
| WO | WO 2010/153774 | 5/2010 |

* cited by examiner

*Primary Examiner* — Larry Tarazano
*Assistant Examiner* — Katherine D Leblanc
(74) *Attorney, Agent, or Firm* — Diederiks & Whitelaw, PLC; Gregory P. Kaihoi

(57) ABSTRACT

Dried fruit has a coating of microcrystalline cellulose in an amount effective to prevent agglomeration of the dried fruit. Methods of preparing and using the coated dried fruit are also described. The dried fruit pieces of the present invention are less sticky and are readily separated from one another using ordinary gravity feed handling conditions.

19 Claims, No Drawings

COATED DRIED FRUIT AND METHODS

CROSS-REFERENCE TO RELATED APPLICATIONS

This application claims the benefit of priority under 35 U.S.C. 119(e)(1) of a provisional patent application Ser. No. 61/109,330, filed Oct. 29, 2008, which is incorporated herein by reference in its entity.

FIELD OF THE INVENTION

The present invention relates to dried fruit products and to their methods of preparation. More particularly, the present invention is directed towards improving the handling properties of dried fruits, such as raisins, by providing the fruit with a coating.

BACKGROUND OF THE INVENTION

Dried fruits, such as raisins, can be difficult to handle in bulk, because the fruit tends to stick together to form large blocks. Blocking of such fruits is particularly problematical in the case of large scale production of combination food products, where a measured amount of a dried fruit is added to other components (such as in the manufacture of ready to eat cereals). When the dried fruit component is delivered to the assembly line suffering from blocking, steps must be taken to separate or "delump" the aggregated fruit before it can be added to other ingredients or otherwise manipulated. Conventionally, dried fruits are delumped by hand screening, or use of a machine. An apparatus for separating blocks of dried fruit is described in U.S. Pat. No. 3,933,086 and also in U.S. Pat. No. 5,697,704. Care must be taken to avoid damaging of the fruit in such deagglomeration operations.

Various solutions have been attempted in order to solve this blocking problem. While improvements can be achieved simply by refrigerating the fruit, this approach is quite costly and does not work very effectively. Coatings have been used on raisins, in particular, in order to prevent blocking. For example, raisins have been coated with sucrose, but this product has been subject to complaints regarding unattractive appearance. Further, the flavor of the raisins is noticeably changed due to the sucrose coating and the added sugar. Raisins have been coated with glycerol by spraying or by immersion in order to keep the raisins soft and pliable. (See, for example, U.S. Pat. No. 1,853,151). A process for improving the bulk handling, transportation and processing of raisins is described in U.S. Pat. No. 4,696,824, wherein raisins are coated with glycerine and oil to enhance bulk handling, transportation and processing. U.S. Pat. No. 5,223,287 describes an alternative approach, whereby dried fruits are stated to have improved handling and physical properties by coating the fruits with a finely divided, specially prepared calcium citrate reaction product.

SUMMARY OF THE INVENTION

Dried fruit is provided with a coating of microcrystalline cellulose in an amount effective to prevent agglomeration of the dried fruit. Surprisingly, it has been found that dried fruit that is provided with this coating exhibit greatly reduced tendency to blocking that might require additional processing steps to break up into discrete fruit pieces. Rather, the dried fruit pieces of the present invention are less sticky and readily separated from one another using ordinary gravity feed handling conditions. Further, the dried fruit is not significantly altered in flavor or appearance by use of the microcrystalline cellulose. The fruit thus is not unduly sweetened or otherwise modified by the present coating. The dried fruit of the present invention also exhibits a surprising handling shelf life, meaning that the fruit can be stored for prolonged periods of time with minimal blocking.

The amount of microcrystalline cellulose used to coat the dried fruit can be very small and thereby not readily visibly apparent, and the final consumer therefore may not even perceive that such a coating has even been applied to the dried fruit. In certain embodiments, the microcrystalline cellulose can only be perceived visually by the unaided eye for a short time period. After a short time, ambient liquids from the fruit or other sources are absorbed by the microcrystalline cellulose, rendering the coating transparent and not generally visually perceivable.

Methods of treating dried fruit to prevent agglomeration of the dried fruit by applying a coating of microcrystalline cellulose to the fruit are also provided. The thus treated dried fruit is useful as a consumable food product by itself, or can be mixed with additional food components to provide a combination food product whether in the form of a loose aggregate such as an RTE cereal with raisins or in the form of a solid agglomeration such as a granola bar.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

For purposes of the present invention, "dried fruit" is fruit from which a portion, but not all, moisture has been removed ("dehydrated"). In embodiments of the present invention, the moisture content of the dried fruit is from about 5 to about 25 percent. The dried fruit of the present invention comprises a sufficient amount of moisture so that, untreated, the fruit will block. In an embodiment of the present invention, the dried fruit as a water activity ($A_w$) of from ≈0.15 to ≈0.75, with a preferred water activity range of ≈0.4 and ≈0.6. Drying fruits to very low water levels indicated by low water activity values, e.g., below ≈0.3, for better handling properties or to avoid moisture equilibration with dried cereal generally result in such dried fruits being extremely tough and leathery and thus difficult to consume.

Optionally, the dried fruit is additionally provided with a humectant or oils, which may be infused or topically applied to improve the texture properties of such dried fruits. In an embodiment of the present invention, humectants are selected from the group consisting of glycerin, glycerol, propylene glycol, corn syrup, dextrose, honey, fructose, high fructose corn syrup, and mixtures thereof. Optionally, the dried fruit can be coated with an edible humectant containing gel, as described in U.S. Pat. No. 5,364,643. For example, dried fruits have been infused with sugars (i.e. a monosaccharide or disaccharide) to moderate the problems of fruit moisture loss and food product moisture gain. Infusing sugars such as honey into fruits, e.g., dates, prior to drying has been practiced from ancient times to lower the water activity while providing dried fruit products that are softer in texture. More recently, refined sugars such as sucrose, fructose and dextrose or corn syrups have been used to infuse dried fruits. (See, for example, U.S. Pat. No. 4,542,033 "Sugar and Acid Infused Fruit Products and Processes Therefor" issued Sep. 17, 1985 to Agarwala.)

Optionally, the fruit may be infused with inulin and dried, as described in U.S. Pat. No. 7,118,772. Optionally, the dried fruit may be provided with an additional coating, such as a sugar coating in the form of an initially dry, crystalline sucrose coating.

In an embodiment of the present invention, the dried fruit is free of any dry external additive other than the coating of microcrystalline cellulose. In another embodiment of the present invention, the dried fruit is free of any external additive other than the coating of microcrystalline cellulose. In an embodiment of the present invention, the dried fruit is free of any internal or external additive other than the coating of microcrystalline cellulose except for humectant and optionally added water. In another embodiment of the present invention, the dried fruit is free of internal or external added monosaccharide or disaccharide. In another embodiment of the present invention, the dried fruit is free of any internal or external additive other than the coating of microcrystalline cellulose except for a non-monosaccharide or disaccharide humectant and optionally added water. In an embodiment of the present invention, the dried fruit is free of any internal or external additive other than the coating of microcrystalline cellulose except for optionally added water.

Dried fruit can prepared by any suitable techniques, such as by drying in the sun or by machine.

Examples of dried fruits include dates, figs, raisins, prunes or dehydrated fruits selected from apples, apricots, blackberries, blueberries, banana, cherries, cranberries, currants, mango, pineapple, peaches, raspberries, strawberries, tomato, and mixtures thereof.

The dried fruit can be provided in the form of whole pieces or diced or otherwise segregated or sectioned. In an embodiment of the present invention, the dried fruit is provided in diced or otherwise sectioned portions having at least one dimension of from ≈0.5 to ≈10 cm, or from ≈1 to ≈5 cm.

As noted above, microcrystalline cellulose is applied to the surface of the dried fruit. Microcrystalline cellulose is a naturally occurring polymer derived from alpha cellulose sources, wherein the crystalline portions of the cellulose material have been partially or completely isolated from amorphous portions. Microcrystalline cellulose is widely used in the pharmaceutical industry in the formation of tablets. The microcrystalline cellulose may be derived from any appropriate cellulose source, such as wood pulp and the like.

Commercially available microcrystalline cellulose products include Avicel™ from FMC BioPolymer and LIBRAWCEL™ from Libraw Pharma and typically include 5 to 20% sodium carboxymethycellulose. The degree of polymerization of microcrystalline cellulose is typically less than 400.

In an embodiment of the present invention, the microcrystalline cellulose has an average particle size of from ≈50 to ≈250 microns, with a smaller size being less visible on the fruit.

In an embodiment of the present invention, the microcrystalline cellulose is present at a coating weight of from ≈1 to ≈10 grams per kilogram of fruit. In another embodiment, the microcrystalline cellulose is present at a coating weight of from ≈2 to ≈7 grams per kilogram of fruit. In another embodiment, the microcrystalline cellulose is present at a coating weight of from ≈4 to ≈5 grams per kilogram of fruit.

The microcrystalline cellulose is applied to the fruit using any appropriate dry mixing system. For example, the microcrystalline cellulose may be applied by a continuous enrober set-up, where the dry microcrystalline cellulose is added onto the fruit at the appropriate application ratio, as the fruit tumbles in the rotating enrober. A batch mixer can also be used, with care taken to use minimal shear so as not to disrupt the fruit structure.

Preferably, microcrystalline cellulose is applied after the fruit has been dried. More preferably, the microcrystalline cellulose is applied to the fruit at the site of drying and before transportation to a second manufacturing site in boxes or totes. Preferably, the microcrystalline cellulose is applied to the fruit before the dried fruit has had an opportunity to develop significant blockage that would require separation of fruit pieces, thereby avoiding the potential for damage to the fruit and additionally the need to carry out a costly and inconvenient separation step. Also, by avoiding or minimizing blocking, the danger to operators of manual de-blocking can be beneficially reduced.

In an embodiment of the present invention, a dried fruit supplier provides fruit and dehydrates the fruit to a desired water activity level. Before or more preferably after dehydration, the supplier applies a coating of microcrystalline cellulose in an amount effective to prevent agglomeration of the dried fruit. The dried, coated fruit can then be packaged for shipment to a manufacturing customer for use in a food preparation process.

In another embodiment of the present invention, a food manufacturer places an order with a dried fruit supplier for dried fruit having a coating of microcrystalline cellulose in an amount effective to prevent agglomeration of the dried fruit. Upon receipt of this coated dried fruit, the food manufacturer conducts further processing operations to package the coated dried fruit, either alone or in combination with other products or in combination with additional food components to provide a combination food product.

In another embodiment of the present invention, a food manufacturer places an order with a dried fruit supplier for dried fruit. Upon receipt of the dried fruit, the food manufacturer carries out optional fruit unblocking operations as needed, and applies a coating of microcrystalline cellulose in an amount effective to prevent agglomeration of the dried fruit. The food manufacturer then conducts further processing operations to package the coated dried fruit, either alone or in combination with other products or in combination with additional food components to provide a combination food product.

The coated dried fruit can be used in its dehydrated state, or reconstituted in water, or can be reconstituted in situ by adding the fruit to liquid food ingredients. Coated dried fruit may be eaten out of hand or used as an ingredient in combination products in baked goods, fruit compotes, stuffings, conserves and the like. Optionally, the coated dried fruit may be packaged with other food components and/or articles for assembly by the consumer. For example, coated raisins may be packaged with celery sticks, peanut butter and a spreading tool to apply the peanut butter to the celery and to position the raisins thereon.

Combination food products can be in solid, plastic or semi-solid form. In solid form, the products can be in a loose particulate form or in the form of a mass. For example, the present dried fruit products find particular suitability for use for inclusion as a functional food ingredient in ready to eat ("RTE") cereals. Such ready to eat cereals are food products in particulate solid form especially in the form of flakes, puffs, shreds, biscuits and mixtures thereof. Preferred examples of RTE cereal products include corn or wheat flakes. Bran flakes with raisins are well known. Also, loose particulate forms can include dry mixes for hot oatmeal or other hot cereals (e.g., wheat or farina hot cereals).

Combination food products can also be in the form of a mass, e.g., a cereal bar. The dried fruit pieces can be admixed with the cereal and formed into a bar such as with a binder. In other variations, the bars can include a separate layer or region including the fruit pieces. The dried fruit pieces can be admixed, if desired with a fruit paste or puree. Good results are obtained when the dried food product comprises ≈1% to ≈40%, preferably ≈15% to ≈35% of the ready to eat cereal while the cereal particulates or cereal base comprises ≈60% to ≈99% of the product. Other typical ready to eat cereal ingredients such as nut pieces, dried marshmallow pieces can be additionally admixed with the blend of the present dried fruit products and ready to eat cereal base.

In still other variations, the microcrystalline cellulose coated dried fruits can be beneficially supplied in bulk to a confectioner that applies thereto a coating such as a chocolate coating to provide, for example, chocolate coated raisin as a confection food item. Providing the dried fruit in the form of coated, free-flowing, dried fruit can greatly facilitate handling in such commercial coating operations.

In other variations, the present dried fruit products in piece form can be added to a variety of other shelf stable food products such as dry mixes for baked goods or goods to be prepared by a commercial or home customer (such as dry mixes for layer cakes, muffins or pancakes), snack or trail mixes (of pretzels, nuts, cereal pieces, candies, dried meats pieces, and mixtures thereof, some versions of which are commonly known as granola).

The present dried fruit products also find suitability for use for inclusion into a wide variety of dairy products, both refrigerated and frozen. For example, the present dried fruit products can be added to the yoghurt to provide products that not only provide the nutrition and taste appeal of fruit. Also, the present dried fruit products can be added to a variety of aerated frozen dairy products such as ice cream or soft serve frozen dairy products. The presence dried fruit products can be added to other nondairy frozen especially aerated frozen desserts such as sorbets. Good results are obtained when the added dried fruit is present as ≈1% to ≈35%, preferably ≈10% to 30% of the dairy product.

All combinations of the independently listed variables of the present description (e.g., fruit identity, coating weight, identity of coating component, water activity, and the like) are expressly contemplated as if individually described.

EXAMPLES

Representative embodiments of the present invention will now be described with reference to the following examples that illustrate the principles and practice of the present invention.

Example 1

Dried glycerated raisins are added into a continuous enrober at a prescribed rate. A small loss in weight feeder (SCHENCK AccuRate Inc., Whitewater, Wis.) is used to add 4.1 g per kg raisins of microcrystalline cellulose (FMC Avicel RC-591) to the raisins. Coated raisins exit the enrober and are packed in 30 lbs cases. They remain free flowing during storage, and can be dumped into a packaging system without the use of a delumper.

All patents, patent applications (including provisional applications), and publications cited herein are incorporated by reference as if individually incorporated for all purposes.

Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. Dried fruit having a coating of microcrystalline cellulose in an amount from approximately 1 to 10 grams per kilogram of fruit without agglomeration of the dried fruit.

2. The dried fruit of claim 1, wherein the microcrystalline cellulose has an average particle size of from approximately 50 to 250 microns.

3. The dried fruit of claim 1, wherein the microcrystalline cellulose is present at a coating weight of from approximately 2 to 7 grams per kilogram of fruit.

4. The dried fruit of claim 1, wherein the microcrystalline cellulose is present at a coating weight of from approximately 4 to ≈5 grams per kilogram of fruit.

5. The dried fruit of claim 1, wherein the dried fruit is raisins.

6. The dried fruit of claim 5, wherein the raisins are free of any additive other than the coating of microcrystalline cellulose except for optionally added water.

7. The dried fruit of claim 1, wherein the dried fruit is selected from the group consisting of dates, figs, raisins, prunes or dehydrated fruits selected from apples, apricots, blackberries, blueberries, banana, cherries, cranberries, currants, mango, pineapple, peaches, raspberries, strawberries, tomato, and mixtures thereof.

8. The dried fruit of claim 1, wherein the dried fruit has a water activity ($A_w$) of from approximately 0.15 to ≈0.75.

9. The dried fruit of claim 1, wherein the dried fruit is free of any dry external additive other than the coating of microcrystalline cellulose.

10. The dried fruit of claim 1, wherein the dried fruit is free of any external additive other than the coating of microcrystalline cellulose.

11. The dried fruit of claim 1, wherein the dried fruit is free of any internal or external additive other than the coating of microcrystalline cellulose, a humectant and optionally added water.

12. The dried fruit of claim 1, wherein the dried fruit is free of internal or external added monosaccharide or disaccharide.

13. The dried fruit of claim 1, wherein the dried fruit is free of any internal or external additive other than the coating of microcrystalline cellulose, a non-monosaccharide or disaccharide humectant and optionally added water.

14. The dried fruit of claim 1, wherein the dried fruit is free of any internal or external additive other than the coating of microcrystalline cellulose and optionally added water.

15. A method of preparing dried fruit comprising applying a coating of microcrystalline cellulose in an amount from approximately 1 to 10 grams per kilogram of fruite without agglomeration of the dried fruit.

16. The method of claim 15, further comprising:
providing fruit;
dehydrating the fruit to a desired water activity level to establish the dried fruit;
before or after dehydration, applying the coating of microcrystalline Cellulose to establish a Dried, coated fruit; and
bulk packaging the dried, coated fruit for shipment to a manufacturing customer for use in a food preparation process.

17. A method of using a coated dried fruit comprising:
placing an order for the coated dried fruit with a dried fruit supplier, the coated dried fruit comprising a dried fruit having a coating of microcrystalline cellulose in an amount from approximately 1 to 10 grams per kilogram of fruit without agglomeration of the dried fruit;
receiving shipment of the coated dried fruit; and
conducting further processing operations to package the coated dried fruit, either alone or in combination with other products or in combination with additional food components to provide a combination food product.

18. The method of claim 15, wherein the coated dried fruit is mixed with additional food components to provide a combination food product.

19. The method of claim 18, wherein the combination food product is a Ready-to-eat cereal.

\* \* \* \* \*